United States Patent [19]

Fauconnet

[11] 4,008,010
[45] Feb. 15, 1977

[54] HYDRAULIC MACHINE

[75] Inventor: Michel Fauconnet, Geneva, Switzerland

[73] Assignee: Ateliers des Charmilles S.A., Geneva, Switzerland

[22] Filed: June 24, 1975

[21] Appl. No.: 589,800

[30] Foreign Application Priority Data

July 9, 1974 Switzerland ............. 9398/74

[52] U.S. Cl. ............... 417/405; 415/158; 415/500; 415/205; 415/219 C
[51] Int. Cl.² .................... F04B 17/00
[58] Field of Search ........... 415/205, 95, 219 C, 415/500, 211; 417/374, 405; 60/325, 330

[56] References Cited

UNITED STATES PATENTS

| 1,879,561 | 9/1932 | Smith | 415/219 C |
|---|---|---|---|
| 2,730,861 | 1/1956 | Buchi | 415/205 |
| 3,128,713 | 4/1964 | Nechine | 415/205 |
| 3,867,059 | 2/1975 | Fauconnet | 415/500 |
| 3,897,167 | 7/1975 | Fauconnet | 415/500 |

FOREIGN PATENTS OR APPLICATIONS

| 1,047,073 | 12/1953 | France | 415/211 |
|---|---|---|---|
| 699,743 | 12/1940 | Germany | 415/219 C |
| 1,503,243 | 5/1969 | Germany | 415/500 |
| 147,546 | 8/1931 | Switzerland | 415/205 |
| 27,642 | 11/1912 | United Kingdom | 415/219 C |
| 542,468 | 1/1942 | United Kingdom | 415/219 C |

*Primary Examiner*—C. J. Husar
*Attorney, Agent, or Firm*—Emory L. Groff, Jr.

[57] ABSTRACT

A hydraulic machine combining a pump and a turbine has pump and turbine runners keyed on a common shaft and designed for the same direction of rotation. The pump is connected to a head by at least two partial volutes, and the turbine by at least two partial volutes wound in opposite direction to those of the pump. Sleeve valves between the runners and their partial volutes enable draining of the pump during turbine operation, and vice versa.

13 Claims, 9 Drawing Figures

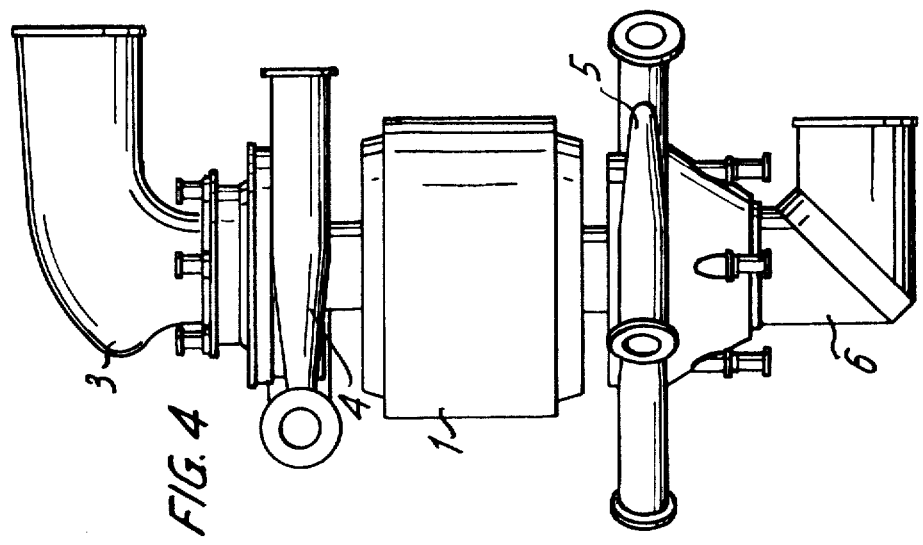
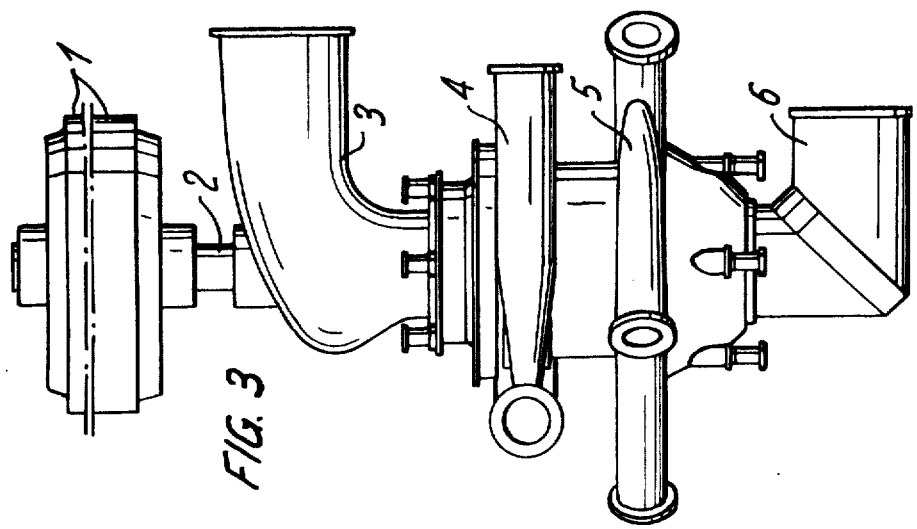

HYDRAULIC MACHINE

The invention relates to machines for transferring energy by turbine-pumps.

In this domain, there has been a great demand for very large machines for use with ever-increasing heads. For this reason, conventional turbine-pumps have been built to the limits of economically acceptable and mechanically possible dimensions.

An aim of the invention is to provide a machine of novel conception suited for use with high unit powers and heads.

A hydraulic machine according to the invention comprises a pump and a turbine with their respective runners keyed on a common shaft, means for draining and separating the spaces in which the pump runner, respectively the turbine runner rotate from an upstream pressure pipe and from downstream pipes, the upstream pressure pipe being connected by means of at least two partial volutes to the pump and by means of at least two partial volutes to the turbine, the winding of the partial volutes of the pump being inverted in relation to that of the partial volutes of the turbine, and the pump and turbine runners being designed for the same direction of rotation.

The accompanying drawings show, schematically and by way of example, an embodiment of the invention, and five variations thereof. In the drawings:

FIG. 3 is an overall side elevation of the machine of FIG. 1; and

FIGS. 4 to 8 are similar side elevations of five varied machines.

Figure 1:
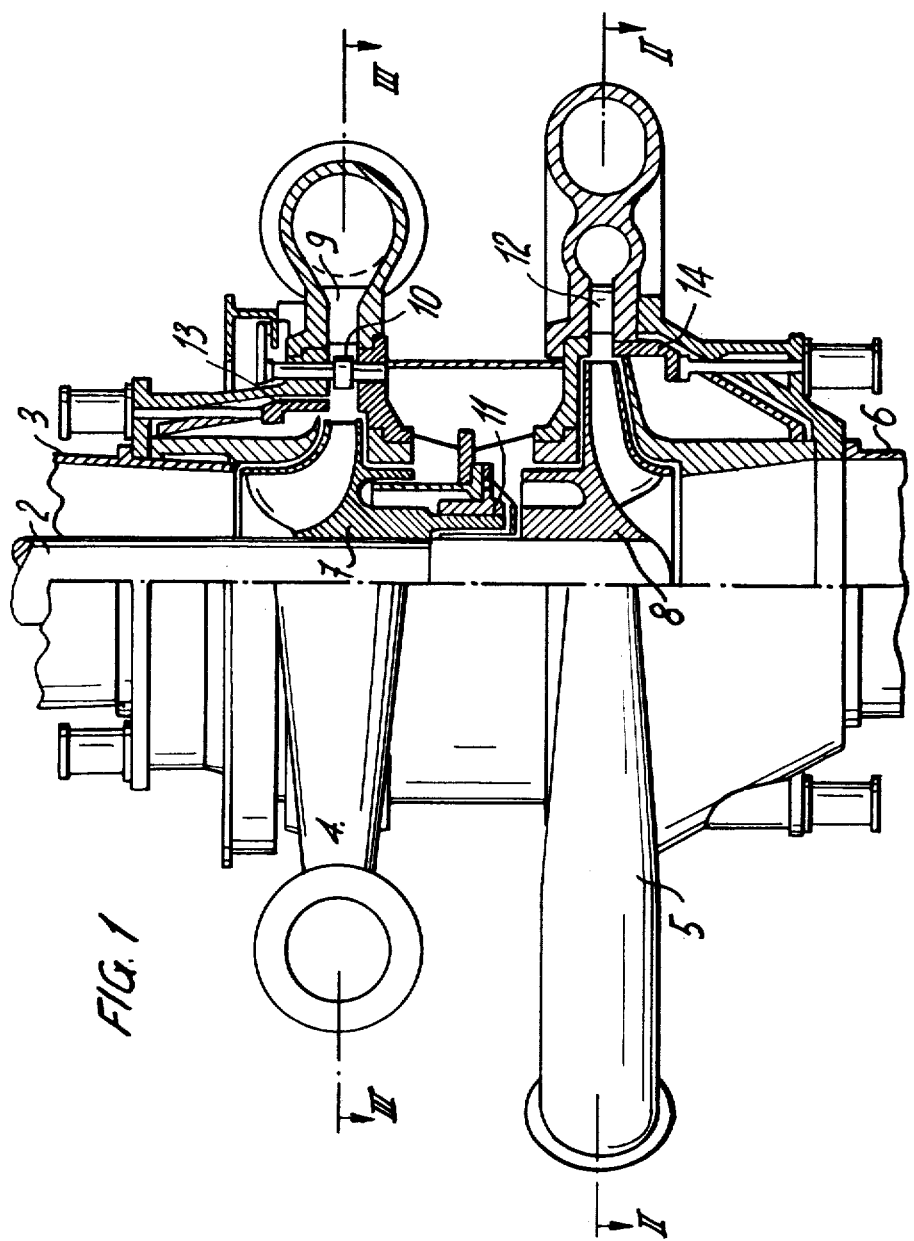
FIG. 1 is an elevational view of a turbine pump, partly in cross-section.

The machine shown in FIG. 1 comprises a single stage pump having four spiral sections or partial volutes 5 acting instead and in place of the usual single spiral casing, and a single stage turbine also having four partial volutes 4.

Figure 2A:
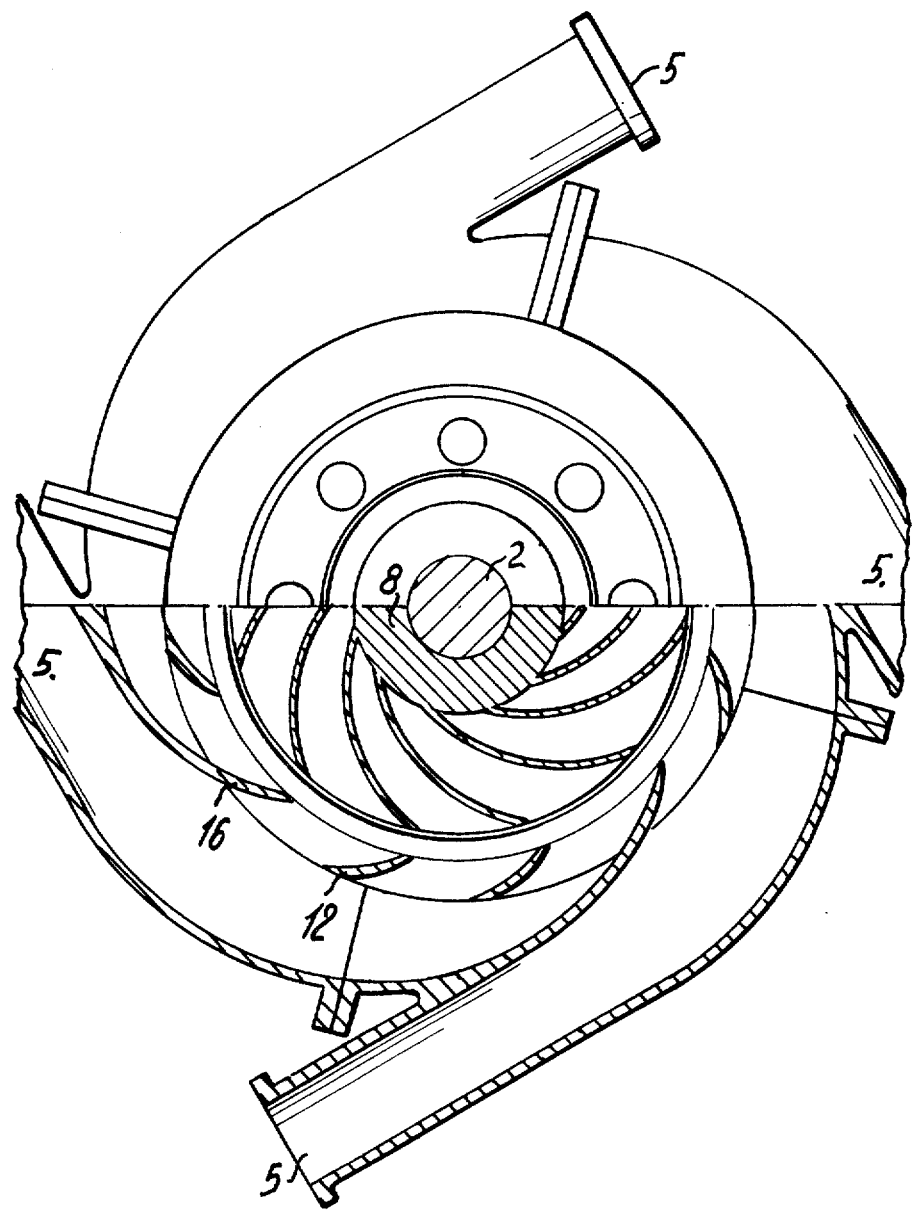
FIG. 2a is an elevational view, partly in transverse cross-section along the line II—II of FIG. 1 showing the pump arrangement.
Figure 2B:
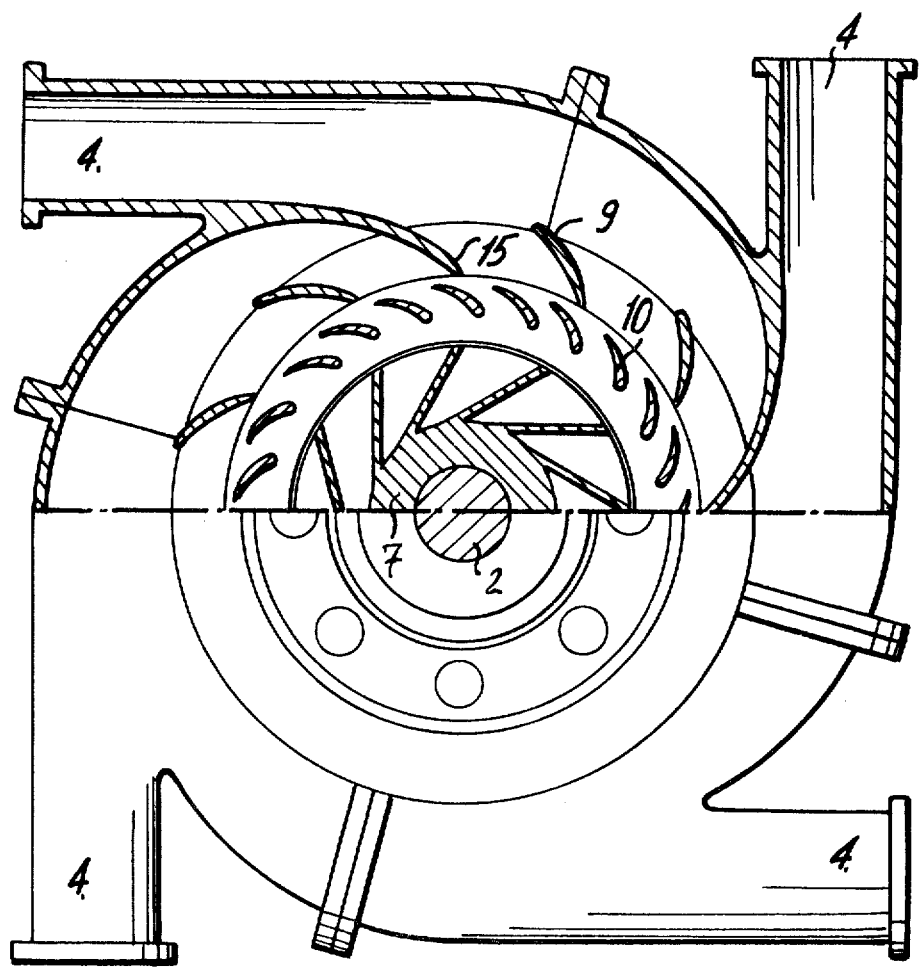
FIG. 2b is an elevational view, partly in transverse cross-section along the line III—III of FIG. 1 showing the turbine arrangement.

As shown in FIG. 2a, the spiral orientation of partial volutes 5 of the pump is inverted relative to that of the partial volutes 4 of the turbine. Each spiral volute is extended outwardly by a generally tangential rectilinear part.

The machine has a vertical shaft 2 coupled at the top of the unit to an alternator-motor 1 (FIG. 3). The alternator-motor could alternatively be placed at the lower end of the shaft.

The pump runner 8 and the turbine 7 are keyed on shaft 2 with their respective aspiration ducts oriented in opposition. Consequently, exhaust elbow 6 of the pump and exhaust 3 of the turbine are also oriented in opposition. The blades of runners 8 and 7 are designed for the same direction of rotation.

A guide bearing 11 is placed between the pump runner 8 and turbine runner 7. The pump runner 8 is mounted with an overhang.

The turbine has a ring of supporting blades 9 which may be in part or entirely replaced by separating fins 15 between the partial volutes 4.

Likewise, the pump has fixed diffuser blades 12 which may be replaced in part or entirely by fins 16 separating the partial volutes 5.

The turbine has orientable guide blades 10 controlled by a conventional mechanism. An orientable diffuser may also be placed between the pump runner 8 and its partial volutes.

A sleeve-valve type obturator 14 enables separation of the internal space in which the pump runner 8 rotates from the internal space of its partial volutes 5, which is filled with water by the piping connecting the machine to the upstream reservoir or head of the plant.

Another obturator 13 of the same type permits separation of the internal space in which the turbine wheel 7 rotates from the internal space of its partial volutes 4 which is also connected to the upstrem reservoir or head of the plant. This obturator 13 is inserted between runner 7 and guide blades 10. It could alternatively be inserted between the guide blades 10 and supporting blades 9.

The distributor of the turbine, formed by the orientable guide blades 10, could replace slide valve 13.

Appropriate manipulation of the various mentioned obturators and known draining and flooding devices permits operation of the machine as a turbine while the pump runner 8 is drained, or operation as a pump while the turbine runner 7 is drained. Splashing or bubbling losses are thus avoided.

This turbine-pump always starts with turbine operation. Its alternator-motor 1 (FIG. 3) is then maintained connected to the electric network whatever be the type of operation, and also during change-over of the type of operation, which is made possible by the layout of its runners, designed for the same direction of rotation.

Numerous variations of the described embodiment shown in FIGS. 1, 2a, 2b and 3 may be envisaged. The different variations may principally be distinguished from one another by the position of the runners on the shaft, the orientation of their aspiration ducts and the position of the alternator-motor in relation to the pump and turbine runners.

In a first variation, shown schematically in FIG. 4, the pump and turbine runners are, as before, keyed on shaft 2 with their aspiration ducts oriented in opposition. The exhaust elbow 6 of the pump and exhaust 3 of the turbine are thus also oriented in opposition. However, the alternator-motor 1 is inserted between the pump and turbine runners.

Figure 5:
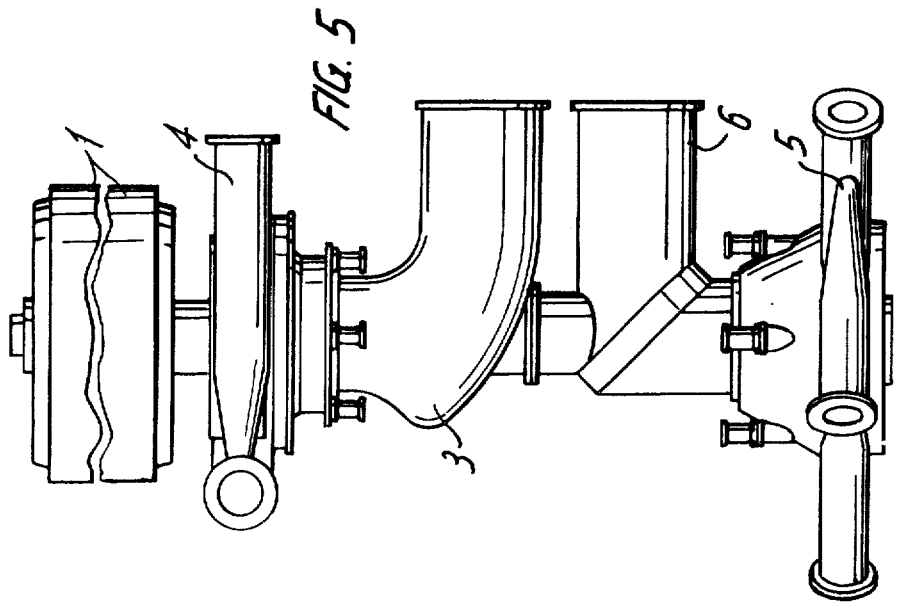

In the second variation, schematically shown in FIG. 5, the pump and turbine runners are keyed on shaft 2 with their respective aspiration ducts facing one another (considered in the direction of flow). The same applies to the exhaust elbow 6 of the pump and exhaust 3 of the turbine. The alternator-motor 1 is coupled to the end of the shaft, at the turbine end (as shown) or the pump end.

Figure 6:
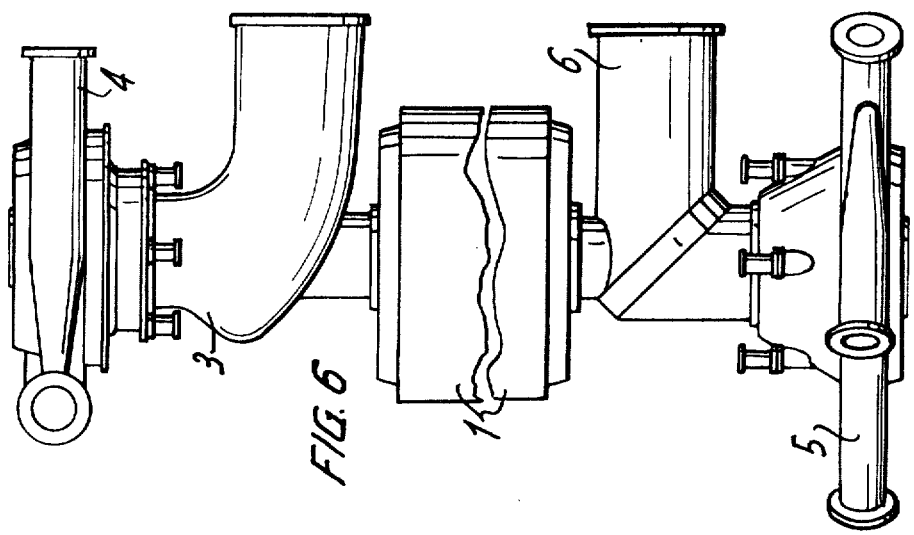

In the third variation shown schematically in FIG. 6, the pump and the turbine runners are keyed on shaft 2 with their respective aspiration ducts facing one another. The same applies to the exhaust elbow 6 of the pump and exhaust 3 of the turbine. The alternator-motor 1 is inserted between the pump and turbine runners.

Figure 7:
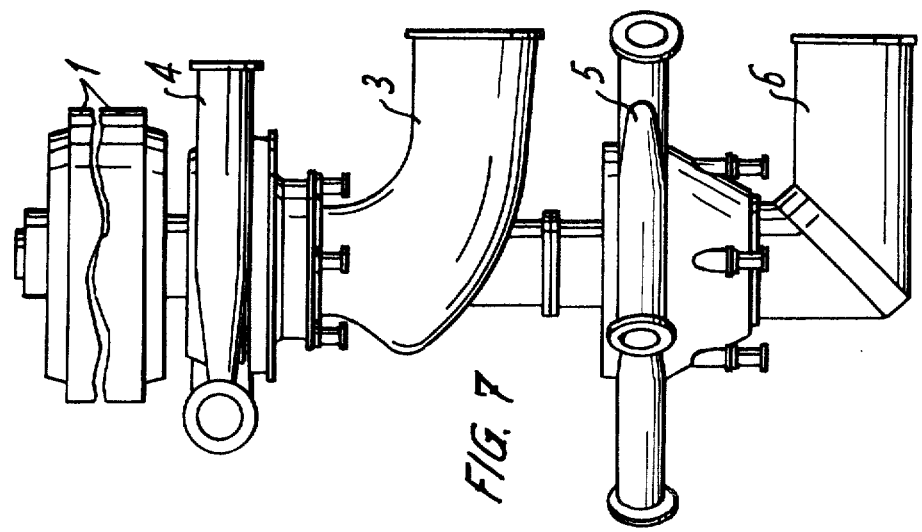

In the fourth variation schematically shown in FIG. 7, the pump and turbine runners are keyed on the shaft with their aspiration ducts both facing in the same direction. The pump exhaust elbow 6 and turbine exhaust 3 thus both also face in this same direction. The alternator-motor 1 is coupled to the end of the shaft, at the turbine end (as shown) or the pump end.

Figure 8:
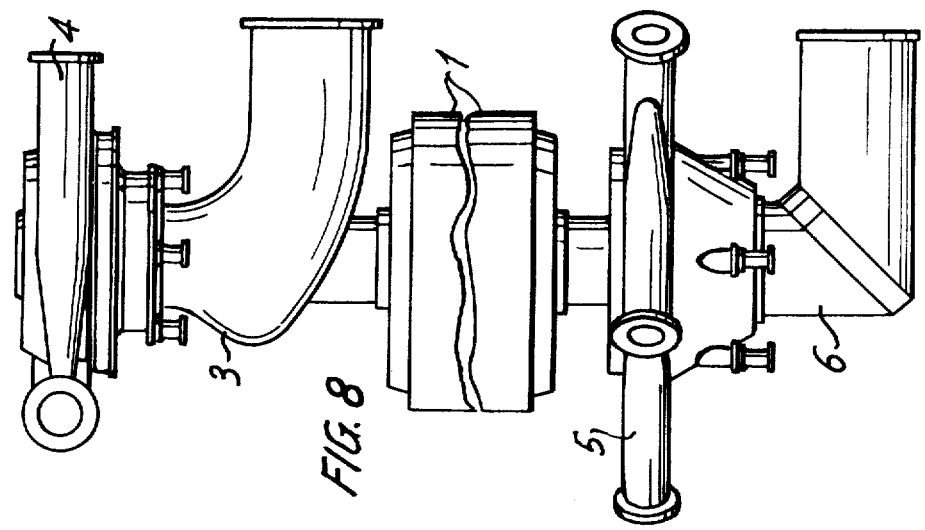

In the fifth variation shown schematically in FIG. 8, the pump and turbine runners are keyed on the shaft with their aspiration ducts both facing in the same direction. The pump exhaust elbow 6 and turbine exhaust 3 thus both also face in this same direction. The alternator-motor 1 is coupled between the pump and turbine runners.

In all of these variations, known means and considerations can be applied for the choice of the positions of the guide bearings of shaft 2, for the passage of shaft 2 through the turbine exhaust 3 or pump exhaust elbow 6, or for placing the pump and/or turbine runner(s) with an overhang when appropriate.

The shaft 2 may be vertical, horizontal or oblique.

The runners may be of the radial, axial or diagonal type.

The machine may have multiple pump and/or turbine stages.

The pump and turbine can each have any number of partial volutes 5, 4. This number (at least two) may be different for the pump and turbine.

The volutes can have any suitable shape and may be of symmetric section (as in FIG. 1) or twisted laterally. They may be set about the periphery of the runner forming equal spiral angles of incidence (as in FIG. 2a and 2b) or unequal ones.

The partial volutes 5, 4 of the pump and turbine may each be composed of several identical or different elements welded together during assembly on the site or assembled by bolted flanges or other means.

The partial volutes 5, 4 of the pump and/or turbine and the pipes by which they are extended can be connected in any suitable manner to a manifold or collector connecting them to the upstream head or reservoir.

In particular, the partial volutes 5 of the pump may lie substantially in a median plane (II—II FIGS. 1 and 2a) through the periphery of the pump runner 8, the junctions of these volutes to piping connected to the manifold or collector being also situated in this median plane II—II.

Likewise, the partial volutes 4 of the turbine may lie substantially in a second median plane (III—III, FIGS. 1 and 2b), above the first, and passing through the periphery of the turbine runner 7, the junctions of these volutes with piping connected to the manifold or collector likewise being situated in this median plane III—III.

The partial volutes 5 and 4 of the pump and turbine may be connected in pairs by Y-manifolds.

The sleeve valve 14 of the pump and/or the sleeve valve 13 of the turbine may be replaced by any suitable valves or gates placed between the partial volutes 5, 4 of the pump and/or turbine and the pipeline connecting the machine to the upstream reservoir or head.

The principal advantages of the described machines for very high power units, or units operating with very high heads, are:

Reduced bulk of the partial volutes compared to a corresponding single spiral casing.

Reduced mechanical stresses due to the pressure of water acting in the volutes, compared to those produced by the same pressure in a corresponding single spiral casing.

The volume of water to be drained or filled during manoeuvring is reduced when the mentioned obturators are inserted in the piping connecting the partial volutes to the collector or manifold between the machine and the head.

These three above advantages can be accentuated by increasing the number of partial volutes.

Reduction of the mechanical stresses permits the use of less thick sheet metal and facilitates welding.

Careful choice in the composition of the partial volutes from identical elements enables rationalisation of manufacture.

The problems of transport and assembly on the site of such partial volutes are easier to resolve than for corresponding single spiral casings and are far heavier and bulkier.

Finally, the use of these hydraulic machines eliminates problems in starting up for pumping, which set limits to the acceptable unit power for certain types of turbine-pumps, either because of the complexity and cost of auxiliary equipment, or especially because of perturbations in the electric network produced by such manoeuvres.

I claim:

1. A hydraulic machine comprising a pump, a turbine, pump and turbine runners keyed on a common shaft, means defining separate first and second spaces for rotatably receiving the pump and turbine runner respectively, at least two first partial volutes communicating with said first space for connection to an upstream head, at least two second partial volutes communicating with said second space for connection to an upstream head, and means for separating each of said first and second spaces from the head to drain the respective space, said first and second partial volutes having inverted winding directions, and said pump and turbine runners being designed for the same direction of rotation.

2. A hydraulic machine according to claim 1, in which the pump and turbine runners are adjacent and keyed on the shaft with respective aspiration ducts thereof oriented in opposition, and comprising an alternator-motor coupled to an end of the shaft.

3. A hydraulic machine according to claim 1, in which the pump and turbine runners are keyed on the shaft with respective aspiration ducts thereof oriented in opposition, and comprising an alternator-motor inserted between the pump and turbine runners.

4. A hydraulic machine according to claim 1, in which the pump and turbine runners are keyed on the shaft with respective aspiration ducts thereof oriented facing one another, and comprising an alternator-motor coupled to an end of the shaft.

5. A hydraulic machine according to claim 1, in which the pump and turbine runners are keyed on the shaft with respective aspiration ducts thereof oriented facing one another, and comprising an alternator-motor inserted between the pump and turbine runners.

6. A hydraulic machine according to claim 1, in which the pump and turbine runners are keyed on the shaft with respective aspiration ducts thereof both oriented in the same direction, and comprising an alternator-motor coupled to an end of the shaft.

7. A hydraulic machine according to claim 1, in which the pump and turbine runners are keyed on the shaft with respective aspiration ducts thereof both oriented in the same direction, and comprising an alternator-motor inserted between the pump and turbine runners.

8. A hydraulic machine according to claim 1, comprising a sleeve valve inserted between at least one of the pump and turbine runners and the respective partial volutes.

9. A hydraulic machine according to claim 1, in which the partial volutes are each made of a plurality of elements assembled together.

10. A hydraulic machine according to claim 1, in which the pump and turbine both have a single stage.

11. A hydraulic machine according to claim 1, in which at least one of the pump and turbine includes at least two stages.

12. A hydraulic machine according to claim 1, in which the first and second partial volutes are connected in pairs by Y-manifolds.

13. A hydraulic machine according to claim 1, in which the first and second partial volutes terminate with junctions for direct connection or by means of pipes with said upstream head, said junctions being located in a median plane passing through the periphery of the respective runner.

* * * * *